United States Patent
Shuvalov et al.

(10) Patent No.: US 12,181,978 B2
(45) Date of Patent: Dec. 31, 2024

(54) SYSTEMS AND METHODS FOR EXPORTING AND/OR IMPORTING DATA

(71) Applicants: Atlassian Pty Ltd., Sydney (AU); Atlassian Inc., San Francisco, CA (US)

(72) Inventors: Anatolii Shuvalov, Sydney (AU); Andre van der Schyff, Sydney (AU); Jonathon Patrick Geeves, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 77 days.

(21) Appl. No.: 17/707,048

(22) Filed: Mar. 29, 2022

(65) Prior Publication Data

US 2023/0315581 A1    Oct. 5, 2023

(51) Int. Cl.
*G06F 11/14* (2006.01)

(52) U.S. Cl.
CPC ...... *G06F 11/1464* (2013.01); *G06F 11/1469* (2013.01); *G06F 2201/84* (2013.01)

(58) Field of Classification Search
CPC ............. G06F 11/1464; G06F 11/1469; G06F 2201/84
See application file for complete search history.

(56) References Cited

U.S. PATENT DOCUMENTS

| | | | | |
|---|---|---|---|---|
| 6,732,125 | B1* | 5/2004 | Autrey | G06F 11/1466 707/999.2 |
| 6,877,016 | B1* | 4/2005 | Hart | G06F 11/1458 714/E11.12 |
| 10,567,500 | B1* | 2/2020 | Leshinsky | H04L 67/1097 |
| 10,769,023 | B1* | 9/2020 | Abraham, Jr. | G06F 11/1451 |
| 2004/0204949 | A1* | 10/2004 | Shaji | G06F 11/1469 714/E11.122 |
| 2009/0313311 | A1* | 12/2009 | Hoffmann | G06F 11/2097 |
| 2011/0196842 | A1* | 8/2011 | Timashev | G06F 11/1469 707/679 |
| 2013/0067017 | A1* | 3/2013 | Carriere | G06Q 10/06 709/208 |
| 2017/0220423 | A1* | 8/2017 | Binford | H04L 67/1095 |

* cited by examiner

*Primary Examiner* — Merilyn P Nguyen
(74) *Attorney, Agent, or Firm* — Brownstein Hyatt Farber Schreck, LLP

(57) ABSTRACT

Systems and methods for exporting data from a cloud server and/or importing data to a cloud server are disclosed. The method for exporting data includes receiving a plurality of event records. Each event record includes information about an update to application data of an application. The computer-implemented method further including storing the plurality of event records in near real-time in a predefined storage location and in response to a client export request, creating one or more backup files based on the stored event records in the predefined storage location, and allowing export of the one or more backup files to a local client storage location.

14 Claims, 5 Drawing Sheets

SYSTEMS AND METHODS FOR EXPORTING AND/OR IMPORTING DATA

FIELD

Aspects of the present disclosure are directed to exporting and importing data, and in particular to exporting backup data from a cloud-based server. Other aspects of the present invention are, in particular, related to importing data to cloud-based server for restoration.

BACKGROUND

Background information described in this specification is background information known to the inventors. Reference to this information as background information is not an acknowledgment or suggestion that this background information is prior art or is common general knowledge to a person of ordinary skill in the art.

Cloud-based software products primarily store data associated with cloud-based software products in cloud-based storage. Such cloud-based software products generally rely on a browser-based web interface and/or a dedicated application for a client user to interact with the products, both of which function based mainly on data stored in the cloud-based storage.

However, data utilized by cloud-based software is typically stored remotely and may not be available for local (non-cloud based) access or backed up using client-managed devices.

SUMMARY

Example embodiments described herein are directed to a computer-implemented method for exporting data. The method includes receiving a plurality of event records. Each event record includes information about an update to application data of an application. The computer-implemented method further including storing the plurality of event records in near real-time in a predefined storage location and in response to a client export request, creating one or more backup files based on the stored event records in the predefined storage location, and allowing export of the one or more backup files to a local client storage location.

Some example embodiments described herein are also directed to a computer-implemented method for importing data. The method includes receiving a plurality of event records. Each event record includes information about a restore to application data of an application. The method further includes creating a plurality of write requests based on the plurality of event records, communicating the plurality of write requests to a database application for restoring one or more objects in the storage database, locking access to a storage database, receiving a confirmation message from the database application once the one or more objects are restored in the storage database, and unlocking access to the storage database in response to the confirmation message.

Some example embodiments are directed to a computer processing system that includes a processing unit, a communication interface, and a non-transitory computer-readable storage medium storing instructions. When the instructions are executed by the processing unit, they cause the system to perform one or more of the methods described above.

Some example embodiments are directed to non-transitory computer readable medium that comprises instructions which when executed by a processing unit cause the processing unit to perform the method described above.

Figure 1:
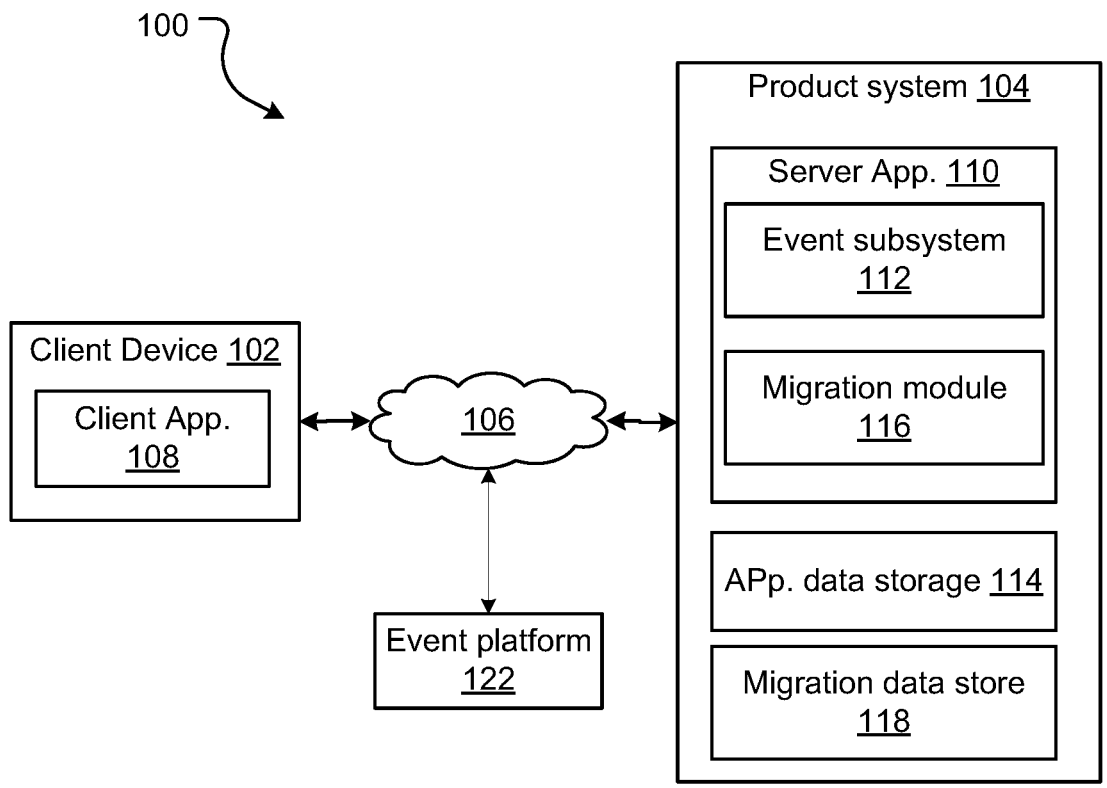
FIG. 1 is a block diagram of a networked environment according to aspects of the present disclosure.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described above, a client user of a cloud-based software product may wish to obtain a copy of their application data from the cloud-based storage. Such data must be prepared for download and then exported through download from the cloud-based storage in order to locally save it to a local storage location of the client user. The preparation for download involves creating a backup of the application data in the form of one or more compressed files, for example, ZIP files.

However, such a process often takes a long time due to the total size of the application data, which may be multiple gigabytes or even terabytes, along with the size of individual files for download which may be well in excess of one gigabyte. Further, for the time taken to create the compressed file or files, there is a need for the cloud-based software product to block the client user from making further changes to its application data in the cloud-based data store until the file or files are created, as they need to be created from static data. This can cause a significant inconvenience to the client user who may be barred from using the product, or at the very least using certain features of the product. Depending on the quantity of application data being compressed, this downtime can often last for hours at a time.

Further, actually downloading the compressed file or files can itself be problematic and will depend on robustness and general quality of the client user's network connection.

Aspects of the present disclosure provide a novel mechanism for exporting application data from a cloud-based software application to a local data store and importing application data to the cloud-based software application from a local data store. In particular, the presently disclosed systems and methods disclose event-based exports and imports. Any changes to application data stored in a main application data store trigger "events". These event records may be stored by the presently disclosed systems and methods. When a data export request is received, application data may be served from the stored event records instead of the main application data store.

Similarly, when a data import is triggered, the presently disclosed systems and methods trigger events based on the imported data. These events are ingested by the software application and the corresponding data is added to a main application data store.

Further, the stored event records may be utilized to serve incremental data exports to users. While organizations may have large amounts of data, most of the data may be "cold," i.e., not actively updated week-on-week. By using the event-based exports disclosed herein, aspects of the present disclosure detect precisely the data that changed since the last data export and allows accurate incremental backups to be provided. This allows a large reduction in the amount of data that is extracted and downloaded each time a backup is requested, hence reducing the time, cost, and resource utilization required by previously known data export solutions.

Although the import/export methods and systems described herein can be implemented on any cloud-based software product, some aspects of the present disclosure will be described with respect to a cloud-based issue tracking system (ITS), for example.

Very generally speaking, an issue tracking system such as Atlassian's JIRA allows users to perform various actions with respect to the creation and management of issues. This includes, for example, defining issue types, issue workflows, creating projects, creating issues, associating issues with projects and/or other issues, transitioning issues between workflow states, editing information associated with issues, assigning issues to specific people/teams.

Use of an issue tracking system may involve creating a project corresponding to a software product (for example, project A corresponds to software product A). Various aspects of the software development process for that product can then be tracked: for example, a person who comes up with an idea for a new feature for software product A may create a 'new feature' issue (or set of related issues) for the feature and associate the issue with project A. As development of feature A progresses (for example, planned, developed, built, tested, released), the feature A issue transitions through various workflow states with information being added to the issue by the relevant stakeholders.

An issue tracking system such as Jira also allows for certain operations to be automated. For example, automation rules may be created which if triggered, cause certain operations to be performed. For example, an automation rule may be defined that causes a particular user (or user group) to be notified if an issue transitions from one particular state to another.

FIG. 1 depicts one example of a networked environment 100 in which the various operations and techniques described herein can be performed. Networked environment 100 includes a client device 102 and a cloud-based software product system 104 (also referred to as a software product system for brevity) which communicate via one or more telecommunications networks 106 (such as the Internet).

The client device 102 may be any device suitable for performing client-side operations described herein, for example a mobile device (e.g., a tablet or mobile phone), a portable device (such as laptop computer), or any other computing device (e.g., a desktop computer).

Generally speaking, users of the client device 102 are associated with one or more user accounts and generate and/or communicate electronic content to the software product system 104. This activity includes any type of user account interaction with the software product system 104, including interaction with content and/or software applications hosted by the software product system 104. Example interactions include accessing/viewing/editing content hosted by the software product system 104, exporting data hosted by the software product system 104, or importing data to be added into the software product system 104, etc.

In order to allow users to perform these functions, as illustrated in FIG. 1, the client device 102 includes one or more client (software) applications (e.g., client app 108) that is configured to access the software application made available by the product system 104. The client 108 may communicate with the software application hosted by the product system 104, render user interfaces based on instructions received from the application, and receive inputs from user accounts allowing them to interact with the application hosted by the product system 104. For instance, the client 102 may generate and render a user interface that allows users to export data from the product system 104 or import data into the product system 104.

The client 108 includes instructions and data stored in the memory (e.g., non-transient computer readable media) of the client device 102 on which the application is installed/run. These instructions are executed by a processor of the client device 102 to perform various functions as described herein. By way of example, some functions performed by the client 108 include communicating with the software application hosted by the product system 104, rendering user interfaces based on instructions received from the product application, and receiving inputs from users to interact with content made available by the product system 104.

The client 108 may be implemented in various ways. For example, the client 108 may be a web browser application, which accesses the application hosted by the product system 104 via appropriate uniform resource locators (URL) and communicates with the product system 104 via general world-wide-web protocols. In this case, the web browser application is configured to request, render and display user interfaces that conform to a markup language, and may be capable of internally executing browser-executable code, or other forms of code. Alternatively, the client 108 may be a specific application programmed to communicate with the product system 104 using defined application programming interface (API) calls. It will be appreciated that a client device 102 can include more than one client application 108, for example both a general web browser application and a dedicated programmatic client application.

It will be appreciated that although only one client device 102 has been depicted, in normal operation, many more client devices 102 may be connected to the product system 104 through the network 106.

In general, the product system 104 is a system entity that hosts one or more cloud-based software applications and/or content. The product system 104 may include one or more server applications (e.g., 110) for hosting corresponding software application(s) and one or more storage devices (e.g., database 114) for storing application specific data. Examples of software applications hosted by product system 104 may include incident management systems (e.g., OpsGenie), software code management system (e.g., Bitbucket), and issue tracking applications (e.g., JIRA). Jira, OpsGenie, and BitBucket are all offered by Atlassian, Inc. It will be appreciated that the presently disclosed systems and methods can be used with any cloud-based product systems without departing from the scope of the present disclosure.

In order to run a product application, the server application 110 includes one or more application programs, libraries, APIs, or other software elements that implement the features and functions of the application. For example, where client application 108 is a web browser, server application 110 will be a web server such as Apache, IIS, nginx, GWS, or an alternative web server. Where client application 108 is a specific application, server application 110 will be an application server configured specifically to interact with that client application 108.

In one example the server application 110 includes an event subsystem 112, a migration module 116, and an import module. The event subsystem 112 is configured to create event records for broadcasting to the event platform 122 whenever data in the application data store is updated. Generally speaking, the event subsystem 112 may generate two types of events-start-up events (also referred to as bootstrap events) and change events. Start-up events are triggered by a start-up action or a creation action, that is an initial establishment of data, for example, creating a project or creating an issue, etc in an ITS. Change events (also referred to as Change Data Capture (CDC) events) are triggered by a change in established data (even if that established data has been changed before), for example, assigning an issue or updating the status of an issue in an ITS.

The event records may include, e.g., information about the object that has changed or been created (e.g., object name and identifier), information about the event (e.g., object creation, deletion, update, assignee update, etc), the actual update (e.g., new data and/or old data), time of the update, etc. In other examples, instead of the update, the event record may include a replication of the full state of the object, i.e., the record may include a new version of the object along with a version identifier (also referred to as a sequence number). As the event platform 122 may be an asynchronous system that does not guarantee delivery of event records in order, having the complete new version of the record may help simplify the logic used to create backup files. Further, the sequence number field may include a number generated from a monotonically increasing time source or system clock. For example if an object was updated in the application database 114 at 12:10:30 on Feb. 24, 2022, the sequence number field of that object may include a value such as 28. If the same data entry was updated again, 30 seconds later, the sequence number field of the data entry may include a value such as 29. Generally speaking, each time a data entry is updated, the sequence number of the data entry is incremented. In one example, the sequence number may include a 128 bit sequence number that is increased each time the corresponding object is updated.

An example of an event record for a newly created object is provided in table A below—

TABLE A

Example create event record

```
{
"type": "<URN>",
"schema": "product-schema.json",
"events": [
{
"type": "Create",
"resource"; "<URN>",
"object": {
"sequenceNumber": 1,
"entityId": "<URN>".
"tenantId": "<URN>",
"entityType"; "<URN>",
"title": "Sample object",
"contentBody": "Sample content body",
"createdDate": "2022-03-21T22:01:41.995Z",
"lastModifiedDate": "2022-03-21T22:01:41.995Z";
}
]
}
```

As seen in this example, the event record includes not only the object identifier ("resource" field), event type (e.g., "create"), time of the event ("createdDate" and "lastModifiedDate"), but also the actual content of the object (e.g., title, and "contentBody").

In general, the migration module 116 performs various processing in order to log and save event data within a migration data store 118 in real time or near real time. Further, the migration module 116 also, upon request, can create a backup file or files of the saved event data (this will be described in more detail below).

The import module 117 performs various processing to receive event records from the migration module 116, create write requests based on the event records and communicate these to the database server application for writing imported data to the application database 114. In addition, the import module 117 may be configured to receive confirmation from the database server application once data is written to the database 114 and communicate an import complete message to the migration module 116.

In addition to the specific functionality described herein, the server application 110 (alone or in conjunction with other applications) may provide additional functions that are typically provided by server systems—for example user account creation and management, user authentication, and/ or other server side functions.

The product system 104 also stores product data. Product data generally includes: data defining the operation of the hosted application (for example, user accounts, user permissions, and the like); and application data (i.e., the content hosted/maintained by the application, which can be, for example, issue data (in an ITS product platform), incident data (in an IMS product platform), software code (in a source code management platform). The data is stored on and managed by database 114. Database 114 may be provided by a database server application (not shown) which may be hosted by server application 110, but is more typically hosted on a separate physical computer in communication (directly or indirectly via one or more networks 106) with the server application 110.

Typically, the database server application executes to receive and process requests to persistently store and retrieve data that is relevant to the operations performed/ services provided by the product application. Such requests may be received from the server application 110, other server environment applications, and/or (in some instances) directly from client applications such as 108.

The database server application may, for example, be a relational database management application or an alternative application for storing and retrieving data from application database 114. The application database 114 may be one or more non-transient (or persistent) data storage devices—e.g., non-transient computer readable storage devices such as hard disks, solid state drives, tape drives, or alternative computer readable storage devices.

In product system 104, server application 110 persistently stores data to application database 114 via the database server application. In alternative implementations, however, the server application 110 may be configured to directly interact with data storage devices such as 114 to store and retrieve data (in which case a separate data storage application may not be needed). Furthermore, while a single database server application is described, product system 104 may include multiple database server applications. In this case, each database server application may interface with one or more shared data storage devices and/or one or more dedicated data storage devices, and each data storage application may receive/respond to requests from various server-side and/or client-side applications (including, for example server application 110).

In addition to the application database 114, the product system 104 include the migration data store 118 (as discussed above). As noted above, migration data store 118 is used to store event records. In one example, the migration data store 118 may store all event records along with associate timestamps. For example, for a given issue in an ITS project, the migration data store 118 may receive event records each time an action is taken on the issue (e.g., when the issue is created, when the issue is assigned to someone, when a workflow status of the issue is updated, when the issue is resolved, etc.). Accordingly, over time, the migration data store 118 is able to recreate data for that issue that matches the data in the application database 114. In this manner, over time, the migration data store 118 may store application data for all active objects/issues.

In one example, the migration data store 118 stores an event log (e.g., in a file) including event records for each tenant. Over time, the size of such files may grow to be very large. To handle this, the migration data store 118 may delete one or more event records from the corresponding file to reduce the size of the file. For example, it may delete the oldest records in a file to maintain the file size under a threshold size.

In another example, data from event records may be extracted and stored in a database. Table A illustrates an extract of an example database maintained by the migration data store 118 for an ITS. As shown in this table, from each received event record, a database record is created that includes a tenant identifier, a project identifier, an object identifier, an updated type field, an object content field, and a last modified timestamp (retrieved from the corresponding event record).

TABLE A

Example migration database

| Tenant ID | Project ID | Issue ID | Update type | Object content | Last Modified | Sequence No. |
|---|---|---|---|---|---|---|
| 2136 | HR | 361298 | Issue title updated | {text} | 17 Mar. 2022 10:02:12 | 238 |

TABLE A-continued

Example migration database

| Tenant ID | Project ID | Issue ID | Update type | Object content | Last Modified | Sequence No. |
|---|---|---|---|---|---|---|
| 2136 | Admin | 2723490 | Assignee added | {text} | 17 Mar. 2022 10:01:43 | 12 |
| 4329 | IT | 3472834 | Created | {text} | 17 Mar. 2022 10:01:00 | 1 |

In some cases, if the migration data store 118 has finite storage capacity, it may evict data. One or more eviction policies such as first in first out may be employed to evict the data. In other examples, the migration data store 118 may have expandable capacity, in which case, data may not be evicted from the database regularly. Further, in some embodiments, the migration module 116 may cause compaction of data in the data store 118 in order to reduce the size of the data records stored in the migration data store 118.

The migration data store 118 may be any data storage device or system, ranging, for example, from a database server and database (which could span several physical systems) to a simple storage device and file structure. In some examples, migration data store 118 takes the form of Amazon Web Services (AWS) S3 cloud-based storage. Further, the migration data store 118 is described herein as a data store maintained independently within product system 104. In alternative embodiments, migration data store 118 is stored in the application database 114, that is, in the same location as other application data of the product system 104.

In addition to the client device 102 and product system 104, the environment 100 includes an event platform 122. The event platform 122 is configured to receive event records from the event subsystem 112 and is communicatively coupled to the migration module 116 to provide requested event records to the migration module 116. In certain embodiments, the event platform 122 is designed based on a publish-subscribe model. That is, the event listeners send event records to the event platform 122 and consumers (such as the migration module 116) subscribe to the event platform 122 to receive certain types of event data from the event platform 122, such as bootstrap and change event data related to updates in product data. In this model, the publishers categorize the event data into classes without knowledge of which subscribers there may be. Similarly, subscribers express interest in one or more classes of event data and only receive event data from the event platform 122 that is of interest to them. When the event platform 122 receives an event record, it matches the event record with all the subscribers who are subscribed to the event and makes a copy of the event data for each subscriber and stores a copy to the subscriber's queue or stream. In this case, the event subsystem 112 may submit event data to the event platform 122 and the migration module 116 may subscribe to receive bootstrap and change event data related to product data stored in the application database 114. StreamHub® offered by Atlassian, Inc. is one example of such an event platform 122.

As noted, the components of the product system 104 and the event platform 122 run on (or are executed by) computer processing hardware. Computer processing hardware includes one or more computer processing systems. The precise number and nature of those systems will depend on the architecture of the product system 104 and the event platform 122.

For example, in one implementation a single server application 110 of the product system 104 runs on its own computer processing system and a single database server application runs on a separate computer processing system. In another implementation, a single server application 110 and a single database server application run on a common computer processing system. In yet another implementation, the product system 104 may include multiple server applications running in parallel (on one or multiple computer processing systems).

In a further implementation, product system 104 and/or event platform 122 is a scalable, in which application instances (and the computer processing hardware—i.e. the specific computer processing systems required to run those instances) are commissioned and decommissioned according to demand—e.g., in a public or private cloud-type system. In this case, product system 104 and/or event platform 122 simultaneously runs multiple applications (on one or multiple computer processing systems) as required by client demand. Where product system 104 and/or event platform 122 is a scalable system it will include additional applications to those illustrated and described. As one example, the product system 104 and/or event platform 122 may include a load balancing application which operates to determine demand, direct client traffic to the appropriate application instance (where multiple application instances have been commissioned), trigger the commissioning of additional application instances (and/or computer processing systems to run those instances) if required to meet the current demand, and/or trigger the decommissioning of application instances (and computer processing systems) if they are not functioning correctly and/or are not required for current demand.

As a further example, where an application (e.g., server application 110) is implemented as a collection of application services, each application service may run on its own computer processing system or multiple application services may run on a common computer processing system.

Further, while the event subsystem 112 and the migration module 116 are depicted as part of the server application 110, in other embodiments, these modules may be part of an alternative application (running on the product system 104 or an alternative system connected to the product system 104). For example, the event subsystem 112 and/or the migration module 116 could be provided as a native part of the product system, a plugin or add-on to the product system, or a standalone application that communicates with the product system 104 as required (for example, via defined API calls or alternative means).

Server application 110 (and its modules) can be implemented as a monolithic application. Alternatively, server application 110 can be implemented as a collection of independent and autonomous application services (e.g., microservices), such as an event subsystem microservice and a migration microservice. In this case, the constituent application services of server application 110 communicate amongst themselves, with other server applications 110, and/or with client applications 108, via defined interfaces such as web APIs.

Further, although the event platform 122 is depicted as a standalone system, this need not be the case in all implementations. In some cases, the event platform 122 may be an application program that is part of the server application 110 or part of another product application on the product system 104.

While system 100 has been provided as an illustrated example networked environment, alternative system environments/architectures are possible.

Various embodiments and features of the present disclosure are implemented using one or more computer processing systems. One example of a computer processing system is described below with reference to FIG. 2.

Figure 2:
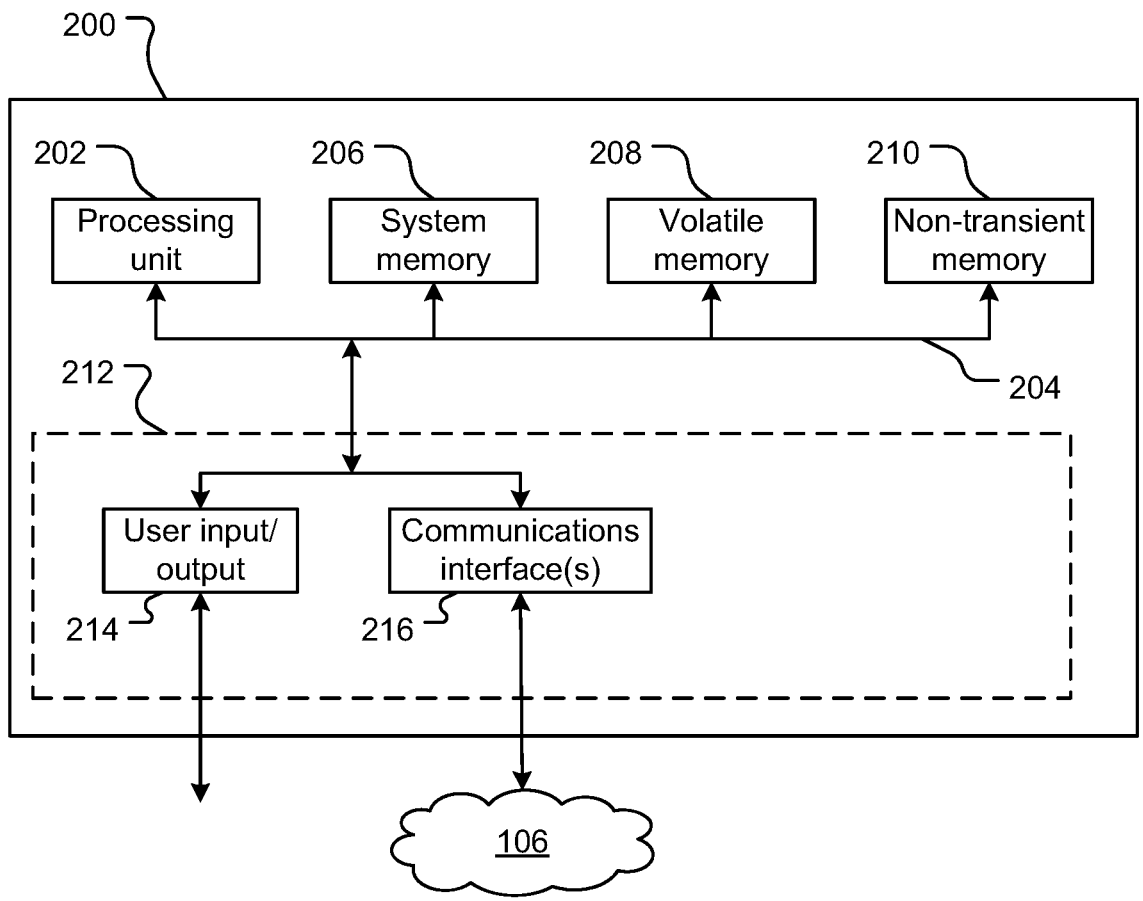
FIG. 2 is a block diagram of a computing system with which various embodiments of the present disclosure may be implemented/configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted. However, system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

System 200 includes at least one processing unit 202. Processing unit 202 may be a single computer processing device (for example, a central processing unit, graphics processing unit, or other computational device), or may include a plurality of computer processing devices. In some instances all processing will be performed by processing unit 202. However, in other instances processing may also be performed by remote processing devices accessible and useable (either in a shared or dedicated manner) by system 200.

Through a communications bus 204, processing unit 202 is in data communication with a one or more machine readable storage (memory) devices which store instructions and/or data for controlling operation of system 200. In this example, system 200 includes a system memory 206 (for example, a BIOS), volatile memory 208 (for example, random access memory such as one or more DRAM modules), and non-transient memory 210 (for example, one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (for example, networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. In other embodiments, other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). In other embodiments, other wireless connections are possible.

Generally speaking, and depending on the particular system in question, devices to which system 200 connects, whether by wired or wireless means, include one or more input devices to allow data to be input into/received by system 200 for processing by processing unit 202, and one or more output devices to allow data to be outputted by system 200. Example devices are described below. However, it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include one or more display devices such as CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also connects to one or more communications networks (for example, the Internet, a local area network, a wide area network, and/or a personal hotspot, amongst others) to communicate data to and receive data from networked devices, which may themselves be other computer processing systems.

System 200 may be any suitable computer processing system such as, by way of non-limiting example, a server computer system, a desktop computer, a laptop computer, a netbook computer, a tablet computing device, a mobile/smart phone, a personal digital assistant, a personal media player, a set-top box, a games console.

Typically, system 200 will include at least user input and output devices 214 and a communications interface 216 for communication with a network such as network 106 of environment 100.

System 200 stores or has access to computer applications (also referred to as software or programs), that is, computer readable instructions and data which, when executed by the processing unit 202, configure system 200 to receive, process, and output data. Instructions and data can be stored on non-transient machine readable storage medium accessible to system 200. For example, instructions and data may be stored on non-transient memory 210. Instructions and data may be transmitted to/received by system 200 via a data signal in a transmission channel enabled (for example) by a wired or wireless network connection.

Applications accessible to system 200 will typically include an operating system application such as Microsoft Windows®, Apple OSX, Apple IOS, Android, Unix, or Linux.

System 200 also stores or has access to applications which, when executed by the processing unit 202, configure system 200 to perform various computer-implemented processing operations described herein. For example, and referring to the networked environment of FIG. 1 above, client device 102 includes client application 108 which configures client device 102 to perform the described client system operations, and product system 104 includes server application 110 which configures product system 104 to perform the described server system operations.

In some cases, part or all of a given computer-implemented method will be performed by system 200 itself, while in other cases processing may be performed by other devices in data communication with system 200.

EXAMPLE METHODS

Figure 3:
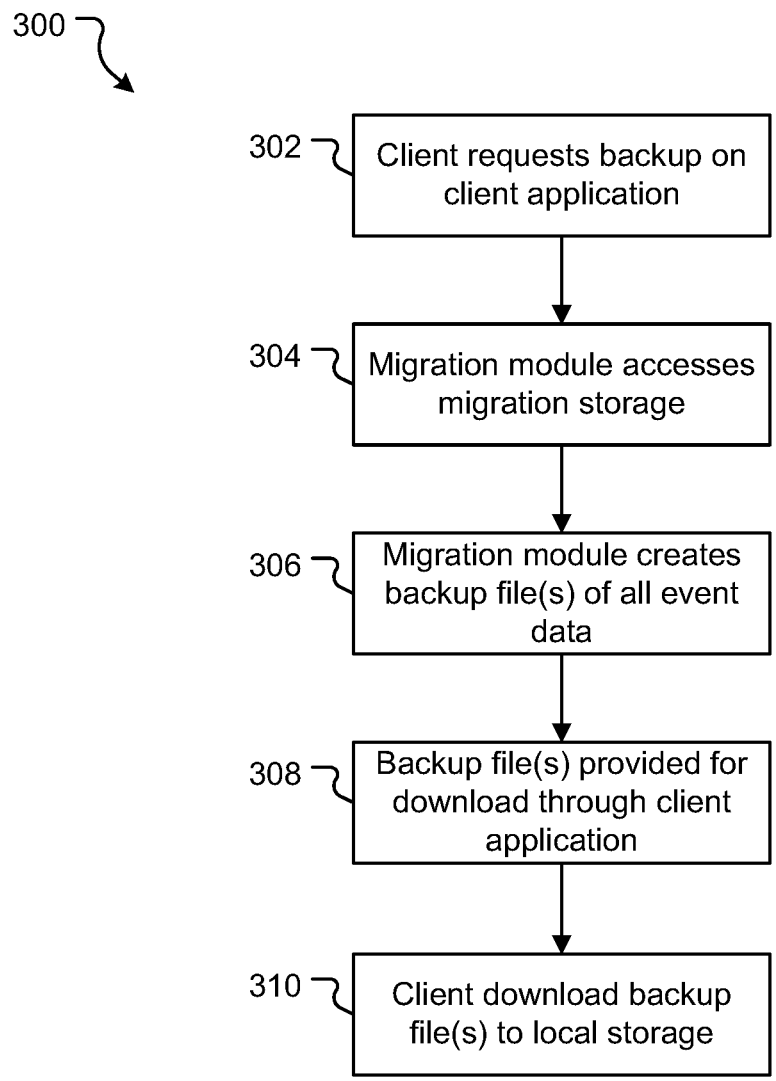
FIG. 3 provides a flowchart indicating data flows of operations performed when an initial backup is requested.

Referring to FIG. 3, a data flow process 300 is described whereby a user of the product system 104 requests the exportation of a backup of their event data for the first time. That is, a backup of all event data is requested by the user for the first time. This process 300 will be described with reference to an ITS. Generally speaking, an ITS application allows users to create projects. For example, an organization may utilize an ITS application such as Jira to run its service desk. The organization may create a tenant account and within that tenant account, it may create a plurality of projects. For example, it may create one project for the business processes team, another project for the engineering team. Similarly it may create projects based on locations of offices within the organization. In any case, once projects are created, issues may be created, updated, resolved, deleted within each project of the tenant. In one example, an administrator of the organization may request a backup of the ITS data related to the entire tenant. In another example, the administrator may request a backup of a subset of the projects maintained for the tenant.

At 302, the user requests a backup of their product data through a user interface provided by client application 108. As noted above, this request could relate to product data stored in respect of a certain tenant, a specific project, a user and/or group of associated users. Further, in the ITS example, the product data may include issue data, configuration data, user data, etc.

Once this option is selected, client application 108 communicates this request to server application 110. In one example, this request may include the identifier of the product data the user wishes to export. For instance, if the user decides to backup data for the entire tenant, the request may include the tenant identifier. If the user wishes to backup data for one or more projects, the request may include the identifiers of the one or more selected projects, and so on.

At 304, the server application 110 invokes the migration module 116 to create a new migration. The migration module 116 in turn generates a command to retrieve the corresponding product data from the migration data store 118. The command may include the identifier of the product data received from the client application 108.

The migration data store 118 receives this command (e.g., via a database server application) and retrieves all data entries corresponding to the identifier of the requested product data. For example, if a tenant identifier is provided, the database server application performs a lookup of the tenant identifier in the migration data store 118 and retrieves all the data stored in the migration data store 118 for that tenant. Alternatively, if one or more project identifiers are provided, the database server application performs a lookup of the one or more project identifiers in the migration data store 118 and retrieves all the data stored in the migration data store 118 for the project(s).

At 306, the migration module 116 initiates a process to create one or more backup files from the retrieved product data. In the case of an ITS, in addition to issue data, the application database 114 may also store configuration data that does not usually change frequently and is stored separately to the issue data. Accordingly, in such cases, at step 306, the migration module 116 may retrieve the configuration data corresponding to the requested product data directly from the application database 114 and add this configuration data to the data retrieved from the migration data store 118 when creating the one or more backup files.

At 308, the created one or more backup files are made available to download by the user through the user interface provided by client application 108 where, at 310, the user can then initiate the download of these one or more backup files to client application local data storage 120.

Figure 4:
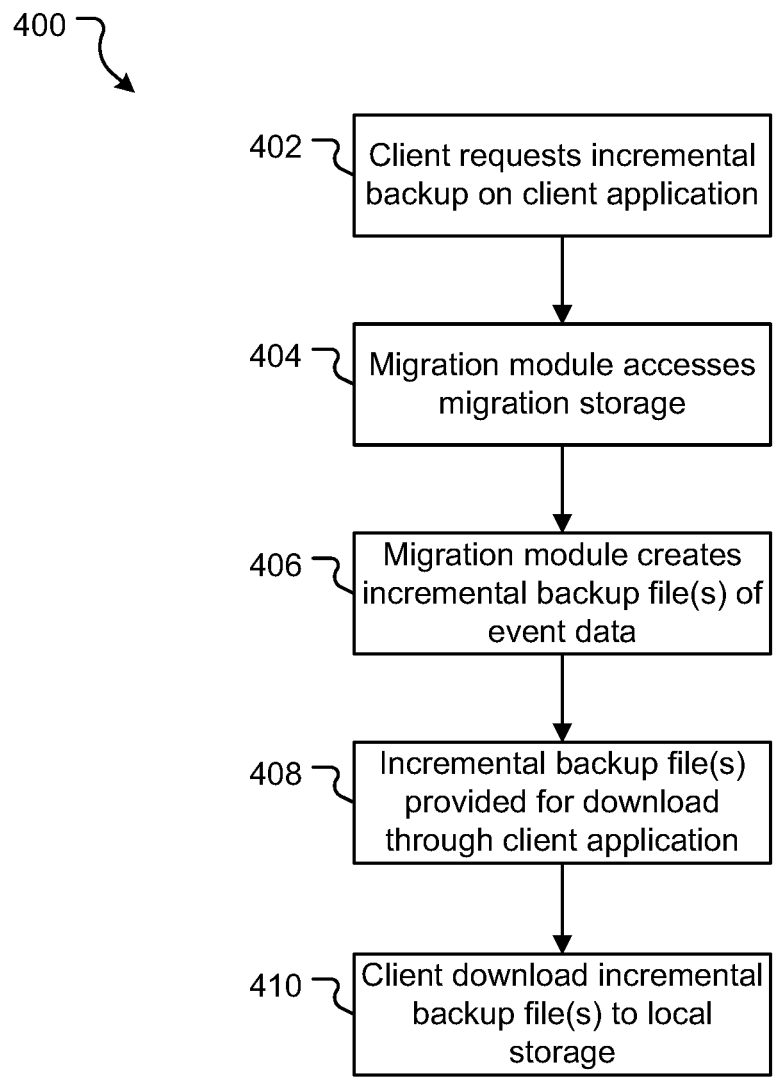
FIG. 4 provides a flowchart indicating data flows of operations performed when an incremental backup is requested.

Referring to FIG. 4, a data flow process 400 is described whereby a user of a product system 104 requests the exportation of a subsequent backup of their event data. That is, the user has requested and obtained a backup of their event data at least once before and wishes to obtain an updated version of the backup of their event data, in other words an incremental backup. In this case, not all event data is required to be obtained, only changes made to the product data since the last backup.

At 402, the user requests an incremental backup of their event data through the user interface provided by client application 108. Once this option is selected, client application 108 communicates this request to server application 110. In one example, in addition to the identifier of the product data the user wishes to export, this request includes a date range. For instance, if the user decides to export data for the entire tenant that changed in the last 15 days, the request may include the tenant identifier and the 15 day date range. Similarly, if the user wishes to export data for one or more projects that changed in the last 30 days, the request may include the identifiers of the one or more selected projects and the 30 day date range.

At 404, the server application 110 invokes the migration module 116 to create an incremental migration. The migration module 116 in turn generates a command to retrieve the corresponding product data from the migration data store 118. The command may include the identifier of the product data received from the client application 108 and the date range.

The migration data store 118 receives this command (e.g., via a database server application) and retrieves all data entries corresponding to the identifier of the requested product data and that fall within the received date range. For example, if a tenant identifier is provided, the database server application performs a lookup in the tenant identifier field and the timestamp field in the migration data store 118 (e.g., see table A) and retrieves all the data stored in the migration data store 118 for that tenant that fall within the received data range. Alternatively, if one or more project identifiers are provided, the database server application performs a lookup for the one or more project identifiers in the project identifier field and performs a lookup of the date range in the timestamp field in the migration data store 118 and retrieves all the data stored in the migration data store 118 for the project(s) that fall within the received date range.

At 406, the migration module 116 initiates a process to create one or more backup files from the retrieved product data. At 408, the created one or more backup files are made available to download by the user through the user interface provided by client application 108 where, at 410, the user can then initiate the download of these one or more backup files to client application local data storage 120.

In some examples, the user may not provide a date range for the incremental backup. In such cases, the migration module 116 may maintain historical backup information based on the backup requests it receives from client devices 102. The migration module 116 may then perform a lookup in this historical information database to determine any previous backups requested by the user for that particular product data. If no previous backups were requested for that product data, the migration module 116 may determine that a full backup is required and may perform steps 304-308 of process 300. Alternatively, if the migration module 116 determines that a backup had been requested for that particular product data, it determines the date/time of that last requested backup and generates a date range that covers the time period since the last backup to the current time and provides this date range to the database server application at step 404. As such, migration module 116 can be configured to create the required incremental or full event data backup depending on whether or not there is a record of a previous backup and, in the case of the incremental backup, only obtain event data that was created after the previous backup.

It will be further appreciated that, in certain circumstances, for example, where there is too long a time period from the last backup, a full backup process (dataflow process 300) can be initiated in place of the incremental backup process (dataflow process 400). Other such circumstances may be, for example, if more than a certain number of events has occurred which would signify major changes in the system data. In such predefined cases, migration module 116 may make a determination on whether an incremental backup or a full backup is required and the relevant dataflow process (300 or 400) can be initiated following the backup request from the user.

The backup files are preferably in Protocol buffer (Protobuf) serialisation format which is advantageous in helping to minimise the overall backup size. In other embodiments, the backup files are in JavaScript Objection Notation (JSON) serialisation format.

It will also be appreciated that system data within the application database 114 of the product system 104 can be restored from a local backup (on the client side) that was previously exported by a user. For example, an organization may maintain two tenant accounts in a product system and may wish to merge these tenant accounts into a single account. In this case, full data for one of the tenant accounts may be exported and then imported into the other tenant account.

Similarly, two organizations may merge and may wish to consolidate their tenant accounts maintained with the product system 104. In such cases, data from one of the tenant accounts can be imported into the other tenant account.

Figure 5:
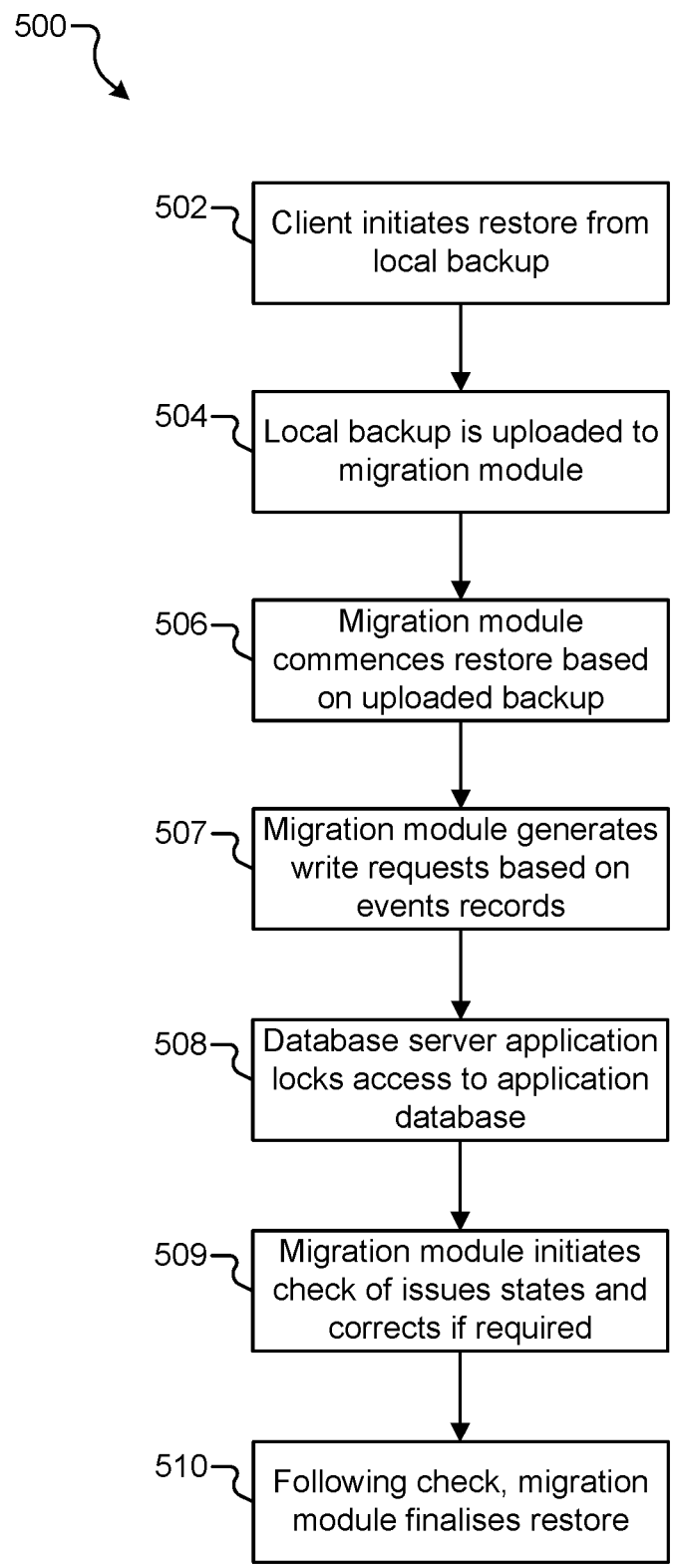
FIG. 5 provides a flowchart indicating data flows of operations performed when a system restore from a backup is initiated.

Referring to FIG. 5, such a data flow process 500 is described. At 502, the user initiates the restoration of their system data based on a previously exported locally stored backup of their product data that is stored in client application local data storage. Following the initiation of the restoration, at 504, the locally stored backup is imported to migration module 116 via an upload and stored in migration data store 118. In other embodiments, the imported backup is stored in another location within the product system 104 such as in the application database 114.

At 506, the migration module 116 commences the system restore based on the imported backup. In particular, the migration module 116 generates event records from the imported backup and communicates these event records to the event platform 122. In some embodiments, the migration module 116 creates event records similar to those created for export (e.g., including update type, tenant/object identifiers, object content and the sequence number associated with that version of the object). In one example, an event record may be created for each object that needs to be written in the application database. Further, each event record may include an event type, such as 'restore application database'.

The import module may subscribe to these types of restore events. Upon receiving the event records from the event platform 122, at step 507, the import module may be configured to generate write requests based on the event records and communicate these to the database server application for writing the corresponding data to the application database 114. In one example, the write request may include the tenant/object identifier, object content and the sequence number associated with that version of the object.

At step 508, the database server application locks access to the application database 114. That is, it prevents any other application or node from writing data to or reading data from the database server application. Further, at this step, the database server application writes data to the application database 114 based on the received write requests. Before writing the data corresponding to an event record in the database 114, the database server application may compare the sequence number in the write request with the latest sequence number of that object in the database 114. If the sequence number of the object is higher in the database 114 than in the received write request, the database server application determines that a newer version of the object already exists in the database 114 and does not write the data. Alternatively, if the sequence number of the object is lower in the database 114 than in the received write request, the database server application determines that a newer version of the object is available and writes the object data to the database 114.

The migration module 116 may also initiate a check of certain data including issue workflow states to check these against the most recent issue workflow states at step 509. This is because the workflow states of issues must not be restored back to their previous workflow state as this would be an incorrect representation of the actual workflow state of the issue. For example, if an issue has a present workflow state of "completed" and the system was restored from a backup taken a point in time in the past where that issue had a workflow state of "pending," it would be incorrect to have the workflow state of the "completed" issue shown as "pending". It will be appreciated that in some embodiments, steps 508 and 509 take place concurrently. In other embodiments, step 509 may not be performed at all.

At 510, migration module 116 finalises the system restore. In some embodiments, this finalization may be indicated by a predefined marker event which, once received and processed, signifies the completion of the restore. In one example, the import module may receive a confirmation message from the database server application after steps 508 and/or 509. Based on this confirmation message, the import module is configured to instruct the database server application to unlock the application database 114. The import module also generates a marker event and communicates it to the migration module 116. Product system 104 is able to then commence normal use based on the restored system.

Generally speaking, the data export methods 300, 400 serve two purposes—1) creating a local copy of data and 2) disaster recovery in case of a major data corruption caused, for example, by a bad script or accidental deletion. In some cases, backwards compatibility, i.e., ability to restore from a previously taken backup may be supported within a predefined time period, for example 30 or 60 days. In other words, even if incremental backups are taken on daily basis, in such cases, the user must take a full back-up at least once per 30 days to maintain the ability to restore the system.

Although, in the above embodiments, processes are directed to backing up of an issue tracking system, it will be appreciated that such processes can be similarly applied to other systems, for example, knowledge management systems, such as Confluence that maintain spaces and one or more pages within those spaces.

Whilst the initial backup of a user's knowledge management application involves a backup of all information pages, incremental backups include pages that have been changed or created since the previous backup.

Unlike known processes, the backup processes described here are mostly non-blocking, meaning users can continue to make changes in parallel with the backup being created, although certain specific actions may be locked (for example, operations with shared configuration which requires consistency of data). This is because there is no need to query the monolith for the backup to be created.

Further, there is a far lower volume of data to be backed up using the processes described herein in relation to events, particularly the incremental backups, than would be required to back up the entire monolith. In particular, the volume of data in the backup processes described here is two orders of magnitude smaller than for a complete system data backup, which amounts to only on average about 2% to 3% of all the system data changing. This makes for a highly consistent and efficient backup for export by users.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including," "includes," "comprising," "comprises," "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer-implemented method, comprising:
receiving a plurality of event records, each event record including information about changes to application data, the application data comprising content managed by an application;
storing the plurality of event records in a predefined storage location;
receiving a client export request for a backup of the application data; and
in response to the client export request:
checking if a client export has been previously requested for the application data;
if there has been at least one previous client export, determining whether a most recent previous client export request was received less than a threshold period of time ago;
upon determining that the most recent previous client export request was received less than the threshold period of time ago, creating one or more backup files based on a subset of the stored event records in the predefined storage location, wherein the subset of event records includes event records received since the most recent previous client export request; and
allowing export of the one or more backup files to a local client storage location.

2. The computer-implemented method of claim 1, wherein upon determining that the most recent previous client export request was received more than the threshold period of time ago, creating the one or more backup files based on all the stored event records in the predefined storage location.

3. The computer-implemented method of claim 1, wherein creating the one or more backup files based on the stored event records in the predefined storage location comprises:
checking if a client export has been requested for the application data previously; and
upon determining that no previous client export requests have been requested for the application data, creating the one or more backup files based on all the stored event records in the predefined storage location.

4. The computer-implemented method of claim 1, wherein the application and the predefined storage location are cloud-based.

5. The computer-implemented method of claim 4, wherein the application is an object tracking application.

6. The computer-implemented method of claim 1, wherein the predefined storage location is independent to a server data storage location for storing the application data.

7. A computer processing system comprising:
a processing unit;
a communication interface; and
a non-transitory computer-readable storage medium storing instructions, which when executed by the processing unit, cause the processing unit to:
receive a plurality of event records, each event record including information about changes to application data, the application data comprising content managed by an application;
store the plurality of event records in near real-time in a predefined storage location;
receive a client export request for a backup of the application data; and
in response to the client export request:
determine if a client export request has been previously requested for the application data;
if there has been at least one previous client export, determine whether a most recent previous client export request was received less than a threshold period of time ago;
upon determining that the most recent previous client export request was received less than the threshold period of time ago, create one or more backup files based on a subset of the stored event records in the predefined storage location, wherein the subset of the stored event records includes event records received since the most recent previous client export request; and
allow export of the one or more backup files to a local client storage location.

8. The computer processing system of claim 7, wherein the non-transitory computer-readable storage medium storing instructions, which when executed by the processing unit, causes the processing unit to:
create, based on determining that the most recent previous client export request was received more than the threshold period of time ago, the one or more backup files based on all the stored event records in the predefined storage location.

9. The computer processing system of claim 7, wherein to create the one or more backup files based on the stored event records in the predefined storage location, the non-transitory computer-readable storage medium storing instructions, which when executed by the processing unit, cause the processing unit to:
check if a client export has been requested for the application data previously; and
upon determining that no previous client export requests have been requested for the application data, create the one or more backup files based on all the stored event records in the predefined storage location.

10. The computer processing system of claim 7, wherein the application and the predefined storage location are cloud-based.

11. The computer processing system of claim 10, wherein the application is an object tracking application.

12. The computer processing system of claim 7, wherein the predefined storage location is independent to a server data storage location for storing the application data.

13. A computer-implemented method, comprising:
receiving a backup from a local client storage location;
generating, based on the received backup, a plurality of event records, wherein each event record comprises information used to restore application data managed by an application;
creating a plurality of write requests based on the plurality of event records, wherein each write request includes information about an object including the object identifier, content of the object, and a sequence number indicating a version of the object;
communicating the plurality of write requests to a database application for restoring one or more objects in a storage database;
locking access to the storage database;
comparing, by the database application and for each write request, the sequence number received in the write request with a sequence number of a corresponding object stored in the storage database;
upon determining, for each write request, that the sequence number received in the write request is higher than the corresponding sequence number of the corresponding object stored in the storage database, writing the content of the object to the storage database and updating the sequence number of the object in the storage database to match the sequence number received in the write request;

receiving confirmation message from the database application, once the one or more objects are restored in the storage database; and unlocking access to the storage database in response to the confirmation message.

14. The computer-implemented method of claim 13, further comprising:

for each write request:

upon determining that the sequence number received in the write request is lower than the sequence number of the corresponding object stored in the storage database, ignoring the write request.

* * * * *